July 23, 1968    LE BARON HOLMES WASHINGTON    3,393,983
APPARATUS FOR GAS GENERATION
Filed Oct. 20, 1964

INVENTOR

Le BARON H. WASHINGTON

BY  *Martha L. Rose*

AGENT 3,393,983
APPARATUS FOR GAS GENERATION
Le Baron Holmes Washington, Annandale, Va., assignor to The Susquehanna Corporation, a corporation of Delaware
Filed Oct. 20, 1964, Ser. No. 405,099
4 Claims. (Cl. 48—2)

ABSTRACT OF THE DISCLOSURE

Apparatus is disclosed for generating a gas within a vessel and subsequently sealing the gas within the vessel. A reactive substance in the vessel is reacted with liquid fed through a passageway to generate a gas and form an insoluble sealant which seals off the passageway. This apparatus is useful for activating pressure-sensitive devices.

---

Figure 1:
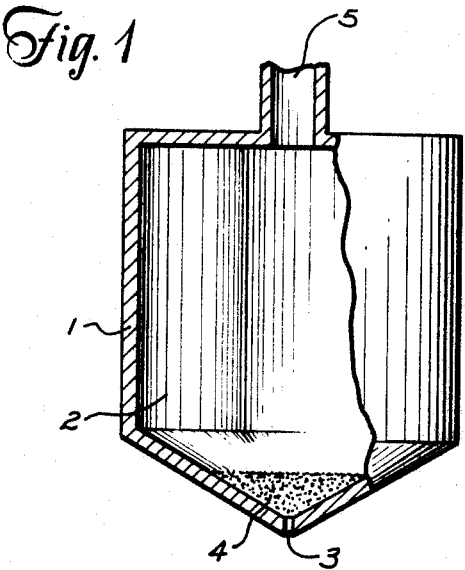

This invention relates to methods and apparatus for generating gas by contacting a liquid with a substance reactive with the liquid to generate a gas.

Systems for contacting liquids with reactive substances to generate a gas are well-known. If the generated gas is to be retained under pressure, means must be provided to prevent escape of the gas at the point of liquid entry. Retention of the pressurized gas has previously been accomplished by the use of mechanical valves or by hydraulic pressure of the liquid. Hydraulic systems of practical size require external fluid pressurization to retain gas under higher pressures while valves are subject to mechanical malfunctions.

The advantages of a liquid activated gas generator in which liquid flow and gas retention are accomplished without moving mechanical parts or external controls are readily apparent. Such generators can be utilized to activate a variety of pressure-sensitive devices. For example, generators of this type can be used to activate warning signals when rivers or other bodies of water rise to flood stage.

Accordingly, it is an object of this invention to provide a liquid activated gas generator in which liquid flow and gas retention are controlled by means of the apparatus design and the nature of the compositions used for gas generation.

The manner in which this, as well as other objects, can be accomplished will be clearly understood by reference to the drawings and the following description.

Figure 2:
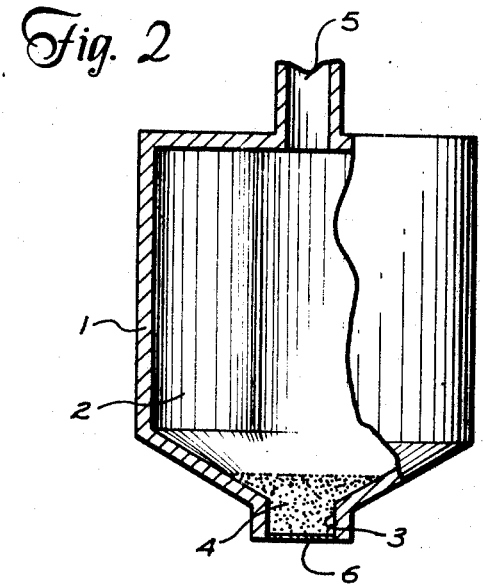

Referring now to the drawings,

FIGURES 1 and 2 are elevational views, partly in section, of gas generators made according to this invention.

Basically, the invention involves passing a liquid through a sealable liquid-admitting means into a vessel containing a substance reactive with the liquid. The substance, when contacted by the liquid, yields a gas and provides an insoluble sealant. The sealant is deposited on the liquid-admitting means to prevent escape of gas.

Any substance which will react to produce a gas and provide a sealant when contacted by a liquid can be employed in the practice of this invention. Selection of a suitable substance for a particular use is determined by consideration of such factors as the gas desired, the pressure required, reactivity with a particular liquid, and the nature of the liquid permeable means to be sealed.

The substance may be a single compound such as, for example, calcium carbide which reacts with water to yield acetylene gas and calcium hydroxide which is an effective sealant.

Alternatively, the substance can comprise a combination of ingredients. For example, a hydrolyzable fluoride, such as iodine pentafluoride can be mixed with calcium carbonate. Contact of the mixture with water yields hydrofluoric acid which reacts with the carbonate to form gaseous carbon dioxide and a calcium fluoride sealant.

The reaction which generates the gas need not yield a sealant as a by-product, since the substance employed may comprise a mixture of gas generating and sealing components. For example, the mixture may contain as a sealing component a relatively insoluble particulate substance such as calcium hydroxide which, when wetted and deposited on the permeable member, becomes a sealant which prevents escape of gas. Alternatively, any of many well-known hydraulic cements or other liquid reactive substances which harden or cure upon contact with water or other liquids can be used as a sealing component.

Many substances suitable for the practice of this invention in either aqueous or nonaqueous liquid systems will be readily apparent to those skilled in the art.

In some instances it may be desirable to encase such a substance by coating it with or encapsulating it in a material which is soluble in the liquid to be admitted. Thus, the time required for the liquid to contact the substance will be dependent on the solubility and thickness of the coating or capsule. Such delay of reaction may be desirable where a large quantity of material is to be reacted. Without such a reaction delay, the permeable member may in some instances be blocked or liquid excluded by gas pressure before sufficient liquid enters to completely react the gas generating material.

Generator vessels of any convenient size and shape which have sufficient strength to withstand the pressures involved may be used. The material used for the vessel should have the ability to resist chemical attack by liquid, reactive substance or reaction products for such time as may be required for a given purpose. The choice of material depends on the intended use of the generator and the nature of the reacting substances. Obviously, vessels satisfactory for many uses can be fabricated from such materials as glass, metals, plastics, natural and synthetic rubbers, wood and wood products. The generator vessel may be of fixed volume or expansible. Weights may be attached to facilitate the submersion and proper orientation of the vessel in a liquid.

The vessel is provided with sealable, liquid permeable means communicating with the internal chamber. In one embodiment the liquid permeable means can be one or more passageways of such size and shape as to control liquid flow into the internal chamber and to be obturated or clogged by the sealant produced by contact of the liquid and reactive substance. The passageways may be, for example, perforations in the bottom of the generator vessel. The rate of liquid flow into the chamber is regulated by varying the number, size, and/or lengths of such perforations (i.e., the thickness of the bottom of the chamber).

Alternatively, liquid flow can be controlled and chamber sealing accomplished by means of a permeable member placed across larger passageways communicating with the internal chamber of the generator vessel. Permeable members formed of paper, cloth, perforated materials, sintered or compacted glass or metal fibers or powders, polymer membranes or any other permeable or semipermeable structures are usable in the practice of this invention. If desired, permeable members such as paper and cloth may be coated with various organic polymers or resins to decrease permeability and/or increase the strength of the permeable member. The permeable member is chosen for compatability with the liquid, the reactive substance, the reaction products, and also for the degree of permeability desired.

Permeable members may be threaded for insertion into tapped openings, wedged into openings, or held in place by adhesives, screws, or other well-known retaining means. Permeable members thus secured are interchangeable to adapt generator vessels to various uses.

The time required for liquid to enter the generator vessel can be controlled by proper choice of the permeable member. Thicker or less permeable members will resist liquid penetration for longer periods of time thus permitting delayed pressurization of the vessel.

One embodiment of this invention as represented by FIGURE 1 comprises a vessel 1 having an internal chamber 2. The vessel has a passageway 3 communicating with the bottom of the internal chamber. The internal chamber contains a substance 4 which is reactive with a liquid to yield a gas and provide a sealant. In operation, a liquid passes upwardly through the passageway 3 into contact with the substance 4. An ensuing reaction yields gas and provides a substantially insoluble sealant which is deposited on and seals the opening by clogging or covering it. The gas can be utilized within the chamber 2 or this chamber may communicate by means of a conduit 5 with a device adapted to utilize the gas generated. Obviously, if the gas is to be utilized within the chamber 2, the conduit 5 is not provided or is fitted with a closure (not shown). The apparatus may be provided with a plurality of liquid-admitting passageways if desired.

The embodiment shown in FIGURE 2 is quite similar. In this embodiment a liquid permeable member 6 is secured across a passageway 3 to control flow of liquid through the passageway. The sealant provided deposits on the permeable member and prevents escape of gas by clogging passageways in the member or by forming an impermeable cake on the member.

The following examples serve to illustrate the practice of this invention.

Example 1

A gas generator is prepared using a plastic vessel having openings at the top and bottom. The bottom opening is covered with "Kimwipe" (a porous tissue paper manufactured by Kimberly-Clark Corp.) to increase the wet strength and reduce the permeability of the tissue, the tissue is sprayed with a solution of nylon (an interpolymer condensation product of hexamethylene diamine, adipic acid, sebacic acid and caprolactam) in a volatile organic solvent. Lumps of calcium carbide are placed in the vessel and an ordinary toy balloon is attached to the top opening. The apparatus is placed in water which penetrates the tissue and reacts with the calcium carbide. Sufficient pressure is generated and retained to inflate the balloon.

Example 2

A similar device to that described in Example 1 is prepared in which several coatings of nylon are applied to the porous tissue. Similar results are obtained with the exception that a substantially longer period of time is required for water to penetrate the tissue.

Example 3

About 1.5 gms. of calcium carbide is encased in a gelatin capsule which is placed in a container. The bottom of the container is fitted with a capillary tube of about 0.01" diameter and the upper portion of the container is fitted with a manometer. The container is partially submerged in water. Water enters the container through the capillary, dissolves the capsule and reacts with the calcium carbide. The reaction yields acetylene gas and calcium hydroxide which obturates the capillary opening. Observation of the manometer shows the pressure generated to be substantially undiminished at the end of two hours.

Preferably the liquid permeable means will be located beneath the reactive substance as described in the above embodiments, in order to facilitate deposit of various sealants on such permeable means. However, if the sealant formed is suspended in the liquid, permeable means located at the side of the chamber can also be effectively sealed.

Other embodiments of this invention within the scope of the appended claims will be apparent to those skilled in the art.

I claim:
1. An apparatus for generating gas which comprises:
   (a) a vessel having substantially impermeable walls which define an internal chamber;
   (b) a substance capable of reacting with a liquid to generate a gas and provide an insoluble sealant, said substance being disposed in said internal chamber; and
   (c) a passageway extending from the internal chamber and continuing to the exterior of the vessel, said passageway positioned below said reactive substance, and said passageway having positioned across its interior a sealable, porous member coated with an organic polymer, said member allowing the passage of liquid through the passageway to the internal chamber, and said member being positioned to receive the insoluble sealant produced whereby the passageway is sealed preventing the passageway of additional liquid to the internal chamber and preventing the escape of generated gas through said passageway.

2. An apparatus of claim 1 wherein said organic polymer coating comprises a nylon coating.

3. An apparatus of claim 1 wherein said sealable, porous member comprises tissue paper coated with nylon.

4. An apparatus of claim 1 wherein the reactive substance is calcium carbide encased in a gelatin capsule and the liquid is water.

References Cited

UNITED STATES PATENTS

| | | | |
|---|---|---|---|
| 47,205 | 4/1865 | Hinkel | 23—282 |
| 997,944 | 7/1911 | Allen | 48—25 |
| 3,140,156 | 7/1964 | Koh. | |
| 714,318 | 11/1902 | Moore | 48—27 |
| 1,081,938 | 12/1913 | Imperatori | 48—60 |

JAMES H. TAYMAN, JR., *Primary Examiner.*